United States Patent [19]
La Follette

[11] 3,923,131
[45] Dec. 2, 1975

[54] SHIFT RING FOR A MARINE CLUTCH

[75] Inventor: Robert L. La Follette, Baldwinsville, N.Y.

[73] Assignee: American Challenger Corporation, Fulton, N.Y.

[22] Filed: Aug. 26, 1974

[21] Appl. No.: 500,491

[52] U.S. Cl. ................. 192/21; 192/48.91; 192/51; 192/65; 192/94; 74/333; 74/378
[51] Int. Cl.² .................... F16D 21/04; F16D 11/06; F16D 19/00; F16H 3/08
[58] Field of Search .............. 192/21, 35, 48.91, 51, 192/65, 94; 74/378, 377, 333

[56] References Cited
UNITED STATES PATENTS

| | | | |
|---|---|---|---|
| 1,001,292 | 8/1911 | Meek | 192/94 X |
| 1,355,152 | 10/1920 | Laird | 74/378 X |
| 1,414,622 | 5/1922 | Carter | 192/21 X |
| 1,430,627 | 10/1922 | Cleland | 192/94 |
| 2,795,964 | 6/1957 | Short | 192/48.91 X |
| 3,269,497 | 8/1966 | Bergstedt | 192/51 |
| 3,539,043 | 11/1970 | Brochetti | 192/65 X |

FOREIGN PATENTS OR APPLICATIONS

| | | | |
|---|---|---|---|
| 705,035 | 4/1941 | Germany | 192/21 |

*Primary Examiner*—Samuel Scott
*Assistant Examiner*—Lance W. Chandler
*Attorney, Agent, or Firm*—Woodcock, Washburn, Kurtz & Mackiewicz

[57] ABSTRACT

A clutch mechanism includes forward and reverse driving gears rotatably mounted on the input shaft which has first and second oppositely threaded driving spiral threads thereon. First and second clutch elements threadedly engage the spiral threads on the input shaft. In the neutral position, the clutch elements rotate with the input shaft but when rotation is impeded, the spiral threads drive the clutch elements axially into engagement with the driving gears. An improved shift mechanism includes a dynamic shift ring disposed between the first and second clutch elements. Axial movement of the dynamic shift ring causes uniform 360° engagement between an outer annular collar on the shift ring and a matching annular surface on a clutch element. This slows the rotation of the clutch element on the input shaft and spiral threads on the input shaft drive the clutch element in the axial direction into clutch engagement or disengagement. A static shift ring is of smaller diameter than the dynamic shift ring. It is moved axially by the dynamic shift ring into engagement with a clutch element at a position close to the center of the clutch element. The static shift ring is spaced from the dynamic shift ring by a spring so that initial axial movement causes engagement between the static shift ring and the clutch elements for static shifting but further axial movement causes engagement of the dynamic shift ring in a surface which has a greater diameter so that a high torque drag is exerted for dynamic shifting.

5 Claims, 7 Drawing Figures

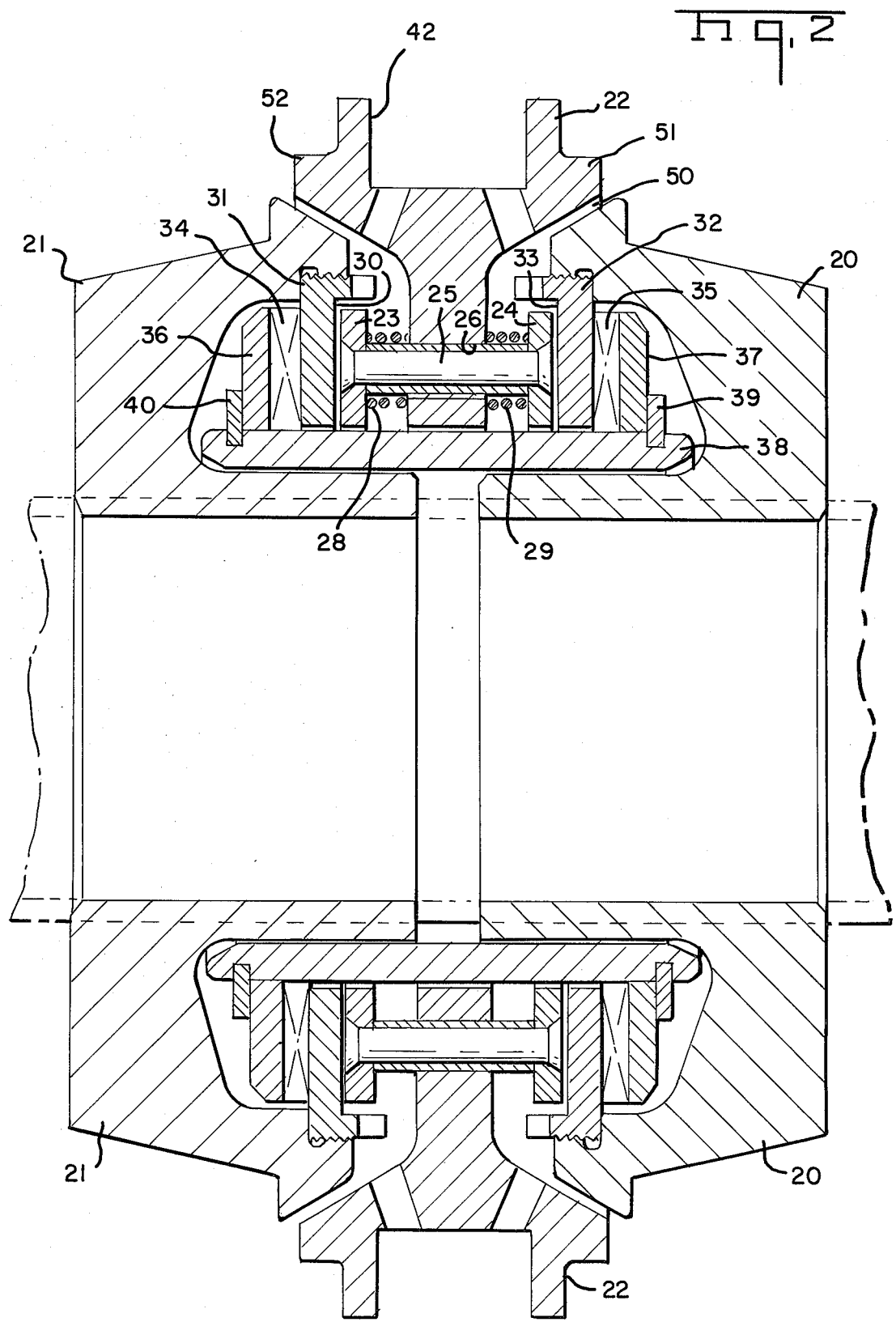

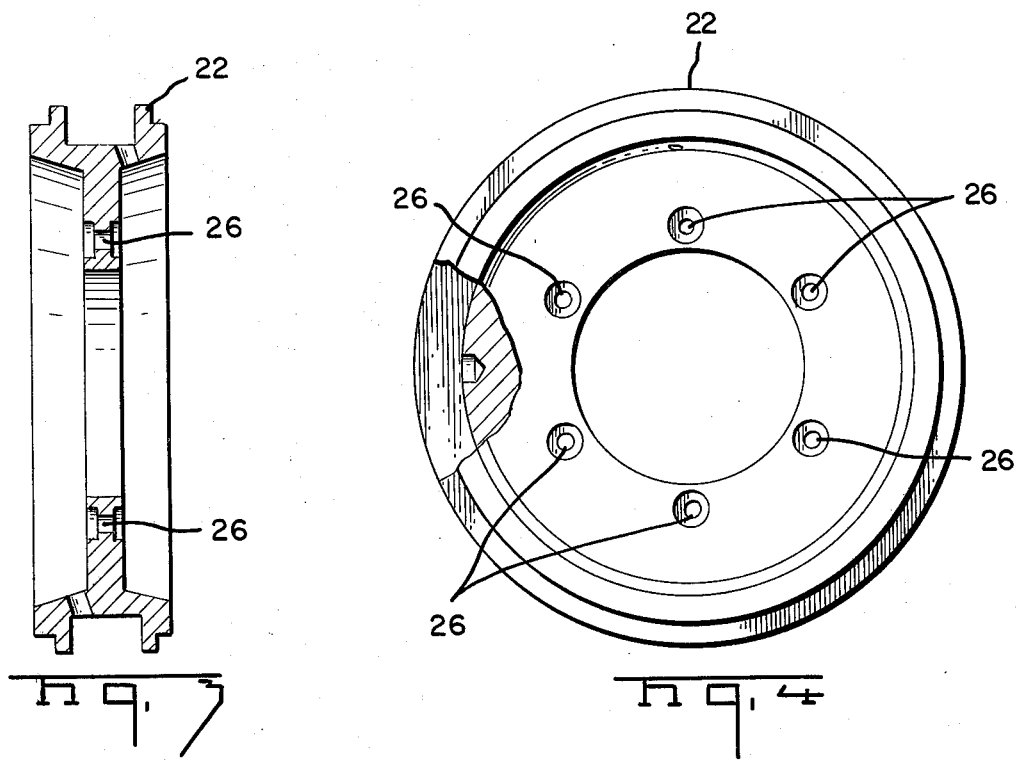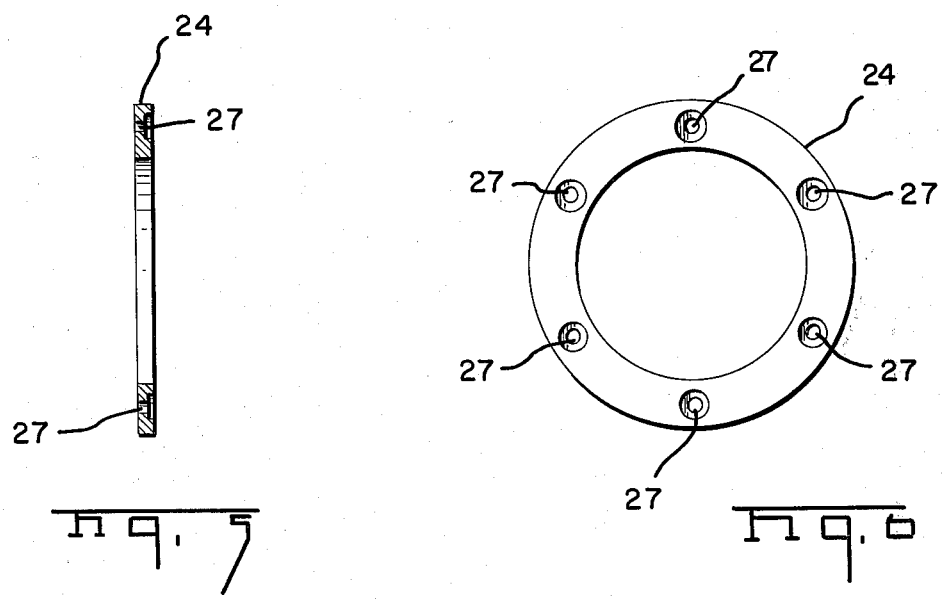

SHIFT RING FOR A MARINE CLUTCH

BACKGROUND OF THE INVENTION

This invention relates to an improved shifting mechanism for a marine clutch.

In marine drives, both dog and friction clutches have been employed. Dog clutches operate with a jerk when engaged, particularly when the engine speed is high. Friction clutches require a considerable amount of power for actuation and are not well suited to remote control.

U.S. Pat. No. 3,212,349 — Bergstedt shows the use of a cone clutch in a marine drive. This cone clutch has the advantage that there is a natural force driving the two mating clutch surfaces into engagement one with the other. While engagement is good in the Bergstedt clutch mechanism, disengagement is a problem. The Bergstedt mechanism uses a disengagement arrangement whereby the mating cone clutch surfaces are literally hammered out of engagement one with the other. This arrangement is subject to malfunction.

The shift mechanism of this invention is for use in conjunction with the clutch claimed in the application of Alan Brownlie, Ser. No. 441,205, filed Feb. 11, 1974. The shift mechanism and clutch are applicable to and can be used in the marine drive fully described in the copending application of Brownlie and Daly, Ser. No. 416,228, filed Nov. 15, 1973.

SUMMARY OF THE INVENTION

In accordance with this invention, a shifting mechanism for a marine cone clutch operates in a manner such that only slight force of the shift linkage is required to initiate a shifting action and the principal engagement and disengagement force is provided by the engine torque.

It is an important object of this invention to provide a shift mechanism for a marine clutch which easily engages and disengages the clutch in both static and dynamic operation.

More particularly, the shift mechanism includes a dynamic shift ring and a static shift ring of smaller diameter than the dynamic shift ring. During dynamic shifting, it is an important advantage of this invention that the dynamic shift ring engages a clutch element along a surface which is around the outer periphery of the dynamic shift ring. This engagement is uniform around the full 360° and this prevents "cocking" which is sometimes present when a force is applied at the outer periphery of a clutch element. Force along this outer periphery surface applies a high torque drag to the clutch element. This high torque drag is used to smoothly engage and disengage the clutch.

It has been found that while engagement around the outer periphery of the clutch element is effective for dynamic shifting, this does not provide good static shifting. In order to easily shift the clutch when the input shaft is not rotating, it is necessary to apply axial force at points close to the center of the clutch elements. For this purpose, I have provided two shift rings. A spring spaces the static shift rings from the dynamic shift ring. Initial axial movement of the dynamic shift ring engages a static shift ring with the clutch element. The force applied is sufficient to statically shift the clutch. However, during dynamic shifting, further axial movement compresses the spring to bring the dynamic shift ring into engagement with the clutch element for dynamic shifting.

The foregoing and other objects, features and advantages of the invention will be better understood from the following more detailed description and appended claims.

DESCRIPTION OF THE DRAWINGS

FIG. 2 shows the details of the clutch shift mechanism;

FIGS. 3 and 4 show the dynamic shift ring;

FIGS. 5 and 6 show the static shift ring; and

DESCRIPTION OF A PARTICULAR EMBODIMENT

Figure 1:
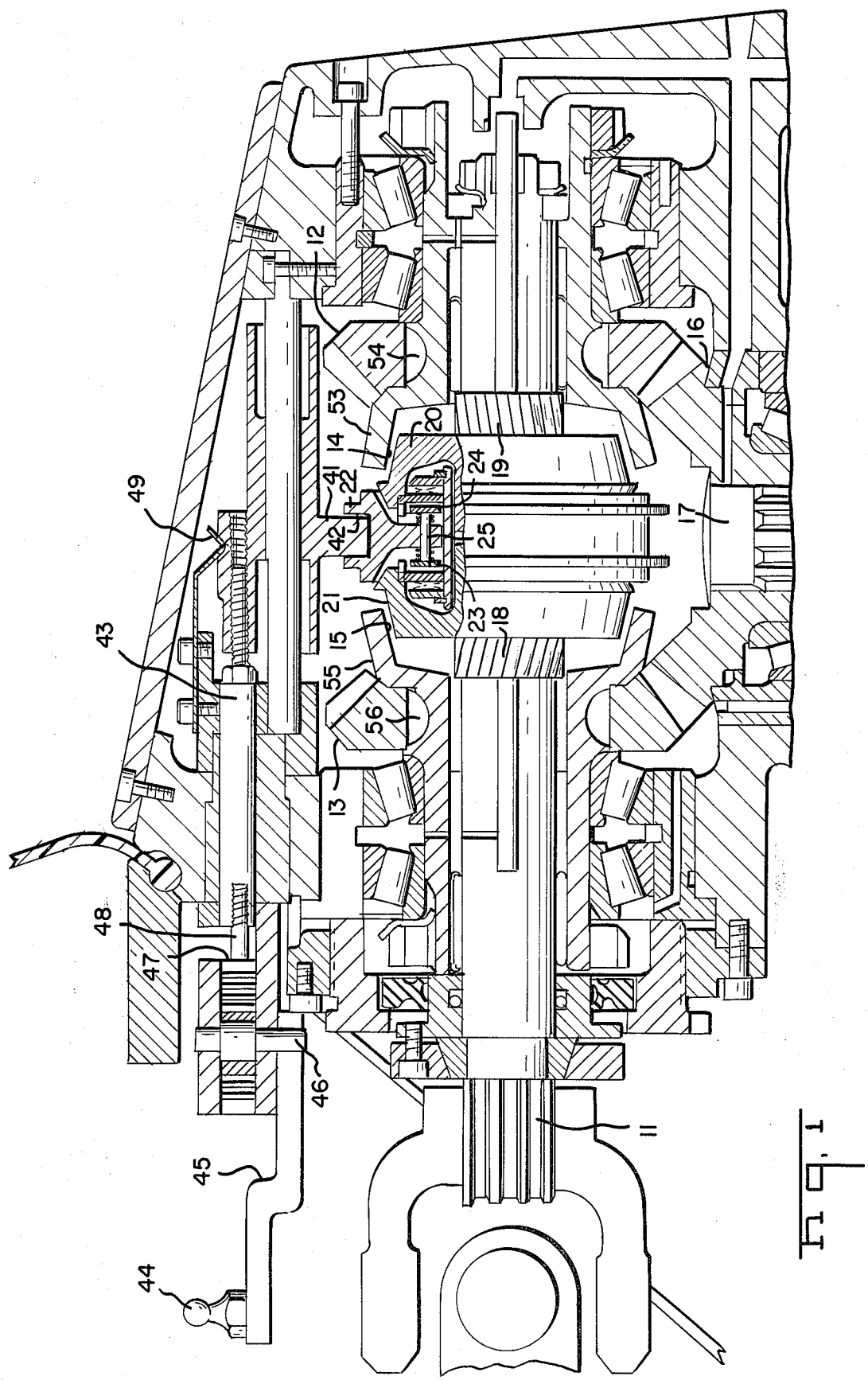
FIG. 1 shows the entire clutch and shifting mechanism.

First, consider the clutch mechanism which is the subject of the copending Brownlie application. The clutch mechanism includes an input shaft 11 which is connected to the marine engine. Bevelled forward driving gear 12 and bevelled reverse driving gear 13 rotate on the input shaft 11. Forward gear 12 has associated therewith a cup member 53 having a cone clutch surface 14. In like manner, reverse gear 13 is associated with cup member 55 which has a cone clutch surface 15.

Gears 12 and 13 engage an output gear 16 which is affixed to the output shaft 17. The shaft 17 is connected to a marine propulsion unit, usually a propeller. The details of the connection between the output shaft and the propeller are more fully shown in the aforesaid Brownlie and Daly patent application. In the neutral position, the output shaft 17 and the engaged gears 12, 13 and 16 do not rotate.

The input shaft 11 has a right hand spiral thread 18 and a left hand spiral thread 19. Clutch element 21 has, on the inner axial surface thereof, a right hand spiral thread which matches that of the spiral thread 18. Clutch element 20 has a left hand spiral thread which matches that of the spiral thread 19. Clutch element 21 has a cone clutch surface which mates with the clutch surface 15. Clutch element 20 has a cone clutch surface which mates with the surface 14.

In the neutral position, both clutch elements 20 and 21 rotate with the input shaft 11.

The shifting mechanism includes a dynamic shift ring 22. The input shaft 11 passes axially through a hole in the center of the ring. The dynamic shift ring 22 is positioned between clutch elements 20 and 21. The static shifting element includes two static shift rings 23 and 24. A rivet 25 extends through each of six holes 26 (FIG. 4) in the dynamic shift ring and through each of six holes 27 in each of the two static shift elements (FIG. 6).

As best seen in FIG. 2, springs 28 and 29 are inserted over the rivets between the static shift rings 23 and 24 and the dynamic shift ring 22. Axial movement of the dynamic shift ring to the left moves the static shift ring 23 into engagement with the inner radial surface 30 of clutch element 21. This inner radial surface is provided by a steel flange 31 which is threaded into the clutch element 21. Similarly, a flange 32 is threaded into clutch element 20 and it provides an inner radial surface 33 for engagement with the static shift ring 24. A roller thrust bearing 34 and a corresponding roller thrust bearing 35 are provided so that the cone clutch elements 20 and 21 can counter-rotate freely one with respect to the other. Thrust washers 36 and 37 are provided to take up the thrust. A sleeve 38 couples the two clutch elements together. Snap-rings 39 and 40 snap into the sleeve 38 and hold the assembly together.

Referring to FIG. 1, the shift linkage includes a bifurcated fork 41 which rides in a groove 42 in the dynamic shift ring 22. A shift rod 43 is threaded into the fork 41. The shift cable is connected to the ball 44. The shift cable moves into and out of the paper on which the ball 44 is depicted. The lever 45 pivots about 46. This rotating motion of the shift lever 45 is converted into an axial left and right movement by the pinion 47 which engages a mating rack 48. The rack 48 is threaded into the shift rod 43. Therefore, a shifting operation is achieved by moving the ball 44 perpendicular to the plane of the paper. This is converted by the rack 48 to a left and right axial movement of the shift rod 43 which in turn moves the shift fork 41 left or right as the case may be. In order to establish a stable neutral position, a detent 49 engages a notch in the shift fork.

The operation of the clutch is as follows. The clutch is initially in the neutral position as shown. When it is desired to shift the clutch into forward, the shift linkage is moved to the right. Consider first static shifting. When the fork 41 is moved toward the right, the static shift ring 24 engages the inner radial surface 33 (FIG. 2). This easily slides the clutch element 20 to the right. As it moves it brings clutch element 21 along with it. During this static shift operation the space 50 between the dynamic shift ring 22 and the element 20 is maintained. It has been found that force exerted on the surface 33 which is close to the axis of clutch element 20 is quite effective in moving it statically. Now consider dynamic shifting into forward. The force exerted by the static shift ring 24 may not create sufficient torque drag to cause the engagement of clutch element 20 with forward driving gear 12. As force is exerted by the fork 41 on the shift ring 22, the spring 29 is compressed. This brings the annular shoulder 51 into engagement with a matching surface on the clutch element 20. There is uniform engagement around 360° between the shoulder 51 and the mating surface on clutch element 20. Engagement along this outer radial surface creates a high torque drag on the clutch element 20. This slows the rotation of clutch element 20.

The spiral threads 19 (FIG. 1) drive the clutch element 20 axially toward the right. The conical surface on element 20 engages the mating surface 14 of the bevelled gear 12. Friction between the two mating conical surfaces drives the member 20 hard toward the right into firm mating engagement with the bevelled gear 12. This drives the output shaft 17 in the forward direction. The motor torque is effectively used to drive the clutch element 20 to the right into firm mating engagement with the clutch surface of the bevelled gear 12.

Note that the ring 22 applies force uniformly around 360° to the element 20. Attempts to move the clutch element 20 axially by force at one point, such as by a pin, or even around a portion of the periphery as by a shift fork have not been entirely successful. This is for the reason that such concentrated force tends to cock the element 20 with respect to the input shaft so that the driving spiral threads cannot move the element 20 smoothly in an axial direction.

When the clutch is to be disengaged from the forward position, the dynamic shift ring 22 is moved axially to the left. However, torque drag exerted by the static shift ring 23 will not be sufficient to disengage clutch element 20. As force is exerted by the fork 41 on the dynamic shift ring 22, spring 28 is compressed until there is engagement between the annular shoulder 52 and the matching surface on clutch element 21. This slows rotation of the clutch element 21. The threaded engagement between the spiral threads 18 and the mating spiral threads on element 21 drives the clutch element 21 toward the left. This brings the element 20 along to the left, counter-rotating with respect to element 21 as it moves out of engagement with the bevelled gear 12. In this manner, the engine torque is effectively used to disengage the clutch as well as to engage it.

Shifting the clutch into reverse is effected in the same manner as previously described except that the shift ring 22 is moved toward the left from the neutral position.

The clutch surface on each driving gear includes a cup member. The cup member 53 is attached to gear 12 by the key 54 and the cup member 55 is attached to gear 13 by the key 56. The cup member has a larger radius than the radius of the driving gear. Therefore, the clutch has greater torque capacity than would otherwise be provided by a clutch surface limited by the radius of the driving gear.

Figure 7:
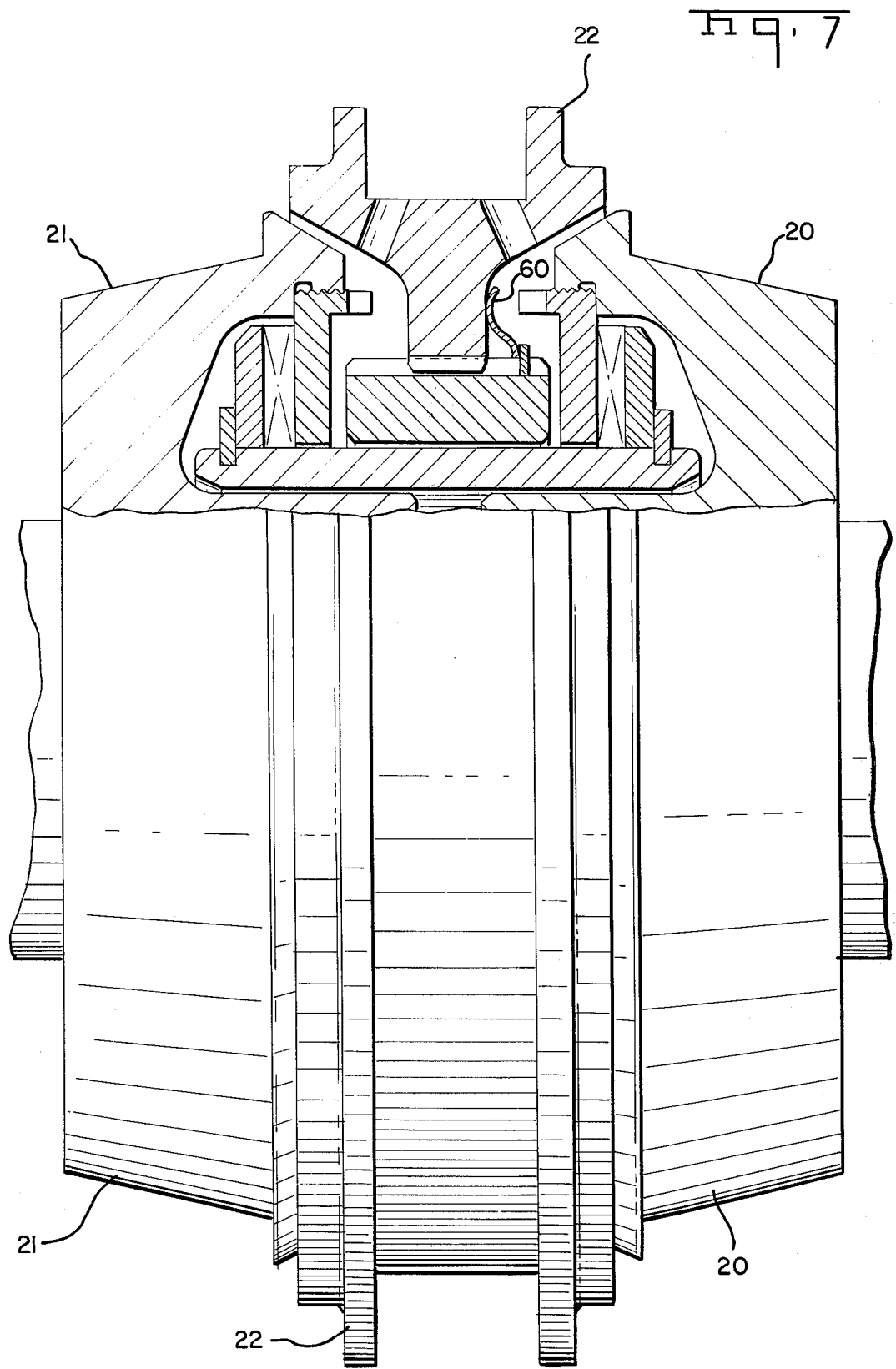
FIG. 7 shows a modification.

FIG. 7 shows a modification of the invention in which the springs 23 and 24 are replaced by leaf-springs 60 and 61. This modification operates in the same manner as previously described.

While particular embodiments of the invention have been shown and described, it will be appreciated that various modifications are within the true spirit and scope of the invention. The appended claims are intended to cover such modifications.

What is claimed is:

1. In a clutch mechanism of the type comprising:
   an input shaft having first and second oppositely threaded driving spiral threads thereon, an output shaft, forward and reverse driving gears rotatably mounted on said input shaft, each of said gears having a clutch surface, an output gear affixed to said output shaft and engaged with said driving gears, and first and second clutch elements each having threads which respectively match said first and second driving spiral threads, each having a clutch surface respectively mating with the clutch surface of said forward and reverse driving gears, an improved shifting mechanism comprising:
   a dynamic shift ring movable axially by a shift linkage, said input shaft passing axially through said ring, said ring being disposed between said first and second clutch elements,
   a static shifting element carried axially by said ring into engagement with the inner radial surface of a clutch element, and
   a spring between said ring and said static shift element, axial movement of said ring initially bringing said static shift element into contact with a clutch element, further axial movement of said ring bringing it into contact with an outer radial surface of a clutch element to slow the rotation of said element on said input shaft whereby the spiral threads drive said element in the axial direction into clutch engagement or disengagement.

2. The shifting mechanism recited in claim 1 wherein said static shifting element is a static shift ring of smaller diameter than said dynamic shift ring, said static shift ring being disposed between said dynamic shift ring and one of said clutch elements.

3. The shift mechanism recited in claim 1 wherein said static shifting element includes two static shift rings of smaller diameter than said dynamic shift ring, one of said static shift rings being disposed between said dynamic shift ring and said first clutch element, the other static shift ring being disposed between said dynamic shift ring and said second clutch element, said two static shift rings being connected together.

4. The shift mechanism recited in claim 1 wherein said dynamic shift ring has an annular shoulder at the outer periphery thereof on both sides of said ring, each of said first and said second clutch elements having a corresponding shoulder whereby axial movement of said ring engages the annular shoulder with the matching surface on one of said clutch elements whereby a high torque drag is exerted on said clutch element to slow rotation thereof.

5. The shifting mechanism recited in claim 1 wherein said shift ring has a groove therein, said shift mechanism further comprising:
 a shift fork disposed in said groove, and
 a shifting linkage connected to said fork to move it axially.

* * * * *